US007695128B2

(12) United States Patent
Tombs et al.

(10) Patent No.: US 7,695,128 B2
(45) Date of Patent: Apr. 13, 2010

(54) PRODUCING AN INK JET IMAGE HAVING HIGH DENSITY AND GRAY SCALE

(75) Inventors: Thomas Nathaniel Tombs, Rochester, NY (US); Donald Saul Rimai, Webster, NY (US); Robert Edward Zeman, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 985 days.

(21) Appl. No.: 11/445,681

(22) Filed: Jun. 2, 2006

(65) Prior Publication Data

US 2007/0279471 A1 Dec. 6, 2007

(51) Int. Cl.

| | |
|---|---|
| ***B41J 2/01*** | (2006.01) |
| ***B41J 2/205*** | (2006.01) |
| ***B41J 2/015*** | (2006.01) |
| ***B41J 2/41*** | (2006.01) |
| ***G11B 3/00*** | (2006.01) |

(52) U.S. Cl. .......................... 347/103; 347/15; 347/21; 347/112

(58) Field of Classification Search ................. 347/103, 347/21, 15, 16, 100, 105, 107, 112
See application file for complete search history.

(56) References Cited

U.S. PATENT DOCUMENTS

| | | | | |
|---|---|---|---|---|
| 3,818,492 | A * | 6/1974 | Matkan | 347/142 |
| 5,365,261 | A * | 11/1994 | Ozawa et al. | 347/103 |
| 5,406,314 | A * | 4/1995 | Kuehnle | 347/115 |
| 5,539,440 | A * | 7/1996 | Higuchi et al. | 347/112 |
| 5,693,375 | A * | 12/1997 | Sato et al. | 427/522 |
| 6,109,746 | A | 8/2000 | Jeanmaire et al. | |
| 6,481,840 | B1 * | 11/2002 | Mueller et al. | 347/88 |
| 6,719,423 | B2 * | 4/2004 | Chowdry et al. | 347/103 |
| 6,736,500 | B2 * | 5/2004 | Takahashi et al. | 347/103 |
| 7,165,495 | B2 * | 1/2007 | Adachi | 101/483 |
| 7,335,848 | B2 * | 2/2008 | Hironaga et al. | 219/69.17 |
| 2003/0066751 | A1 | 4/2003 | May et al. | |
| 2003/0227503 | A1 | 12/2003 | Klausbruckner et al. | |
| 2006/0164489 | A1 * | 7/2006 | Vega et al. | 347/103 |

FOREIGN PATENT DOCUMENTS

| | | |
|---|---|---|
| EP | 0 561 419 | 9/1993 |
| JP | 07156525 A * | 6/1995 |

* cited by examiner

*Primary Examiner*—Stephen D Meier
*Assistant Examiner*—Leonard S Liang
(74) *Attorney, Agent, or Firm*—William R. Zimmerli; Eugene I. Shkurko

(57) ABSTRACT

A printing apparatus having an imaging member having an external surface and a series of substantially equal sized cells located over such surface. The printing apparatus includes an ink jet device for selectively ejecting droplets of ink, having marking particles and liquid, into the cells of said imaging member in a desired image-wise ink pattern, a mechanism for filling the cells of said imaging member with a dielectric fluid after said ink jet device ejects droplets of ink into said cells, and transfer mechanism including a device for fractionating the marking particles in the ink from the liquid and transferring the image-wise marking particle pattern to a receiver member.

12 Claims, 6 Drawing Sheets

PRODUCING AN INK JET IMAGE HAVING HIGH DENSITY AND GRAY SCALE

FIELD OF THE INVENTION

This invention relates in general to printing of ink jet images, and more particularly to printing of ink jet images where a pigmented ink is jetted onto a primary image member to create a gray-scale image and liquid is separated from pigment particles and removed prior to transfer to a receiver member.

BACKGROUND OF THE INVENTION

High-resolution digital input imaging processes are desirable for superior quality printing applications, especially high quality color printing applications. As is well known, such processes may include electrostatographic processes using small-particle dry toners, e.g., having particle diameters less than about 7 micrometers, electrostatographic processes using solvent based liquid developers in which the particle size is typically on the order of 0.1 micrometer or less, and ink-jet processes using aqueous or solvent based inks.

The most widely used high-resolution digital commercial electrostatographic processes involve electrophotography. Although capable of high process speeds and excellent print quality, electrophotographic processes using dry or liquid toners are inherently complicated, and require expensive, large, complex equipment. Moreover, due to their complex nature, electrophotographic processes and machines tend to require significant maintenance.

Ink jet technology may be used to deposit fluid materials on substrates and has numerous applications, mainly in printing. Ink jet printers function by depositing small droplets of fluid at desired positions on a substrate. There are various ink jet printing technologies.

Typical ink jet inks suffer from several problems that limit their usefulness in commercial printing. Inks are generally dye based and subject to fading. The inks have to have low viscosity to minimize plugging of the ink jet nozzles. As a result, the ink must be jetted onto specially formulated absorbent papers. The absorbency of the drops results in low image density and image spread. Clay coated graphic arts papers commonly used in the printing industry to print high quality images cannot be used in ink jet engines because the ink would run on the nonabsorbent clay coated paper. Rather, for high quality imaging, expensive and limited types of papers are used with ink jet printing.

Another limitation to using ink jet technology for commercial printing applications is that all ink has to be dried. This requires a lot of energy to evaporate the water or organic solvents used in the ink and generates a lot of moisture and/or solvent vapors.

To overcome problems associated with fading and low image densities associated with dyed aqueous-based inks, pigmented aqueous-based inks have been disclosed in which a pigmented material is colloidally dispersed. Typically, a relatively high concentration of pigmented material is required to produce the desired highest image densities ($D_{max}$). Exemplary art pertaining to pigmented aqueous-based inks includes U.S. Pat. No. 6,143,807 (Lin et al.) and U.S. Pat. No. 6,153,000 (Erdtmann et al.). Generally, pigmented inks have a much greater propensity to clog or alter the jet(s) orifice(s) of a drop-on-demand type of ink jet head than do dyed inks, especially for the narrow diameter jets required for high resolution drop-on-demand ink jet imaging, e.g., at 600 dots per inch. Drop-on-demand printers do not have a continuous high pressure in the nozzle, and modification of the nozzle behavior by deposition of pigment particles is strongly dependent on local conditions in the nozzle. In continuous ink jet printers using pigmented inks, the relatively high concentrations of pigment typically affects the droplet break-up, which tends to result in non-uniform printing.

In co-pending U.S. patent application Ser. Nos. 11/445,712; 11/446,467; 11/445,713; 11/445,714; 11/445,566, an apparatus, a method, and an ink that can be used to produce high quality at production rates suitable for use in a graphic arts establishment are disclosed. This can be described in brief. Ink having electrically charged marking particles in a dielectric solvent is jetted onto an electrically conducting primary imaging member. The inked image is then passed by a fractionator that subjects the ink to an electric field that drives the marking particles towards the primary imaging member and skives the supernatant solvent off the image, thereby leaving a concentrated ink in the areas corresponding to the image. The charged particles are then pressed into a nip formed by the convergence of the primary imaging member and a receiver. The receiver could be a final image receiver such as paper that is pressed against a roller located on the non-image receiving side of the paper, etc. Alternatively, the receiver could be a transfer intermediate which would receive the image at this point and subsequently transfer it from the intermediate to a final receiver. The image is then transferred from the primary imaging member to the receiver by applying an electrostatic field of such magnitude and polarity as to drive the marking particles towards the receiver.

By transferring concentrated ink, the ink neither runs nor soaks into the paper to any significant extent. This allows one to achieve a high-density image, minimize image spread, and also allows the use of clay-coated papers. Moreover, the amount of solvent that has to then be removed has been greatly reduced, thereby reducing energy consumption and minimizing vapor emissions.

There is prior art that addresses the problem of having excessive fluid in the image by forming the image on an intermediate, then transferring the image to a receiver. U.S. Pat. No. 5,099,256 discloses the use of cylinder specifically coated with a silicone polymeric material in combination with a drop on demand print head. U.S. Pat. No. 6,736,500 discloses the use of a coagulating agent that increases the viscosity of the ink jet ink and improve transfer and image durability. U.S. Pat. Nos. 6,755,519 and 6,409,331 teach methods for increasing ink viscosity such as via UV cross-linking or evaporation. None of these patents address the formation of a multi-color image.

U.S. Pat. Nos. 6,761,446; 6,767,092; 6,719,423; and 6,761,446 refer to forming images on separate intermediates, then transferring the images in register to form a four-color image on a receiver. While these patents address the problem of excess fluid in a four-color image, the process of registration of the component images from separate intermediates involve complex and expensive mechanisms. The situation is further complicated if receivers of different thickness and/or surface properties need to be used. In addition, the receiver path to accommodate successive transfers to form the multi-color image is relatively long, affecting cost and reliability.

A major difficulty encountered with the ink jet developers that use organic solvents is that they tend to spread. This would result in image degradation problems such as a lack of sharpness and resolution. To mitigate this problem, the use of a cellular primary imaging member has been proposed in co-pending U.S. patent application Ser. No. 11/446,467.

Cellular structures are commonly used in printing. For example, in gravure printing, a gravure roller or plate is used. The roller or plate includes a cellular pattern that corresponds to the image to be printed, with the size of each cell corresponding to the amount of ink required to produce a certain density. The gravure roller or plate is produced for each specific image to be printed. It should also be noted that only approximately half of the ink transfers to a receiving member in gravure printing, with the rest remaining in the cells. The residual ink in the cells does not create a problem for traditional gravure printing because identical images are produced in register with the gravure roller or plate. This would, however, create problems for digital printing, where the images may not be produced in register and may, in fact, differ from each other.

Another type of cellular member commonly used in the printing industry is the anilox roller. This device has a periodic array of uniformly sized cells that are used to apply ink in a non-image-wise fashion to an inking member.

A cellular structure can be used as a primary imaging member to minimize the spread of ink droplets jetted from an ink jet nozzle. However, unlike a conventional gravure roller or plate that is job specific, it is highly preferable to use a universal primary imaging roller or plate that can be used for many different images. Such primary imaging roller or plate is capable of having all marking material removed with the printing of each image so that the primary imaging member can be effectively used in digital printing applications without undue stress applied to a cleaning subsystem that would have to remove all residual ink.

To use a cellular or textured imaging member, hereafter referred to as a TIM as a primary imaging member in an ink jet printing press and to minimize the spread of the ink droplets, the ink droplets must be injected into each cell to form a positive image, with the gray scale controlled by varying the amount of ink injected into a cell. The varying amounts of ink in the uniformly sized cells creates a problem transferring the ink because the receiver does not contact the ink.

SUMMARY OF THE INVENTION

In view of the above, this invention is directed to using a TIM in a digital printing press wherein jetting of ink onto the TIM in a manner for both good transfer and the ability to have a gray scale. In such a printing press, liquid is separated from pigment particles prior to transfer to a receiver member. The printing apparatus includes a textured printing or imaging member (TIM) including a series of substantially equal sized cells located over the surface of the printing member. An ink jet device selectively ejects droplets of ink having marking particles and a dielectric liquid into the cells of the printing member in a desired image-wise ink pattern. The cells are then filled with a dielectric liquid, preferably a clear or colorless dielectric fluid. The marking particles are then transferred to a receiving member by forming a nip between the receiving member and the TIM and applying an electrostatic field to urge the particles to the receiving member, leaving behind a substantial portion of the dielectric fluid. The fluid is thereafter removed from the cells in any suitable known manner and can be filtered or otherwise purified and recycled.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1A:
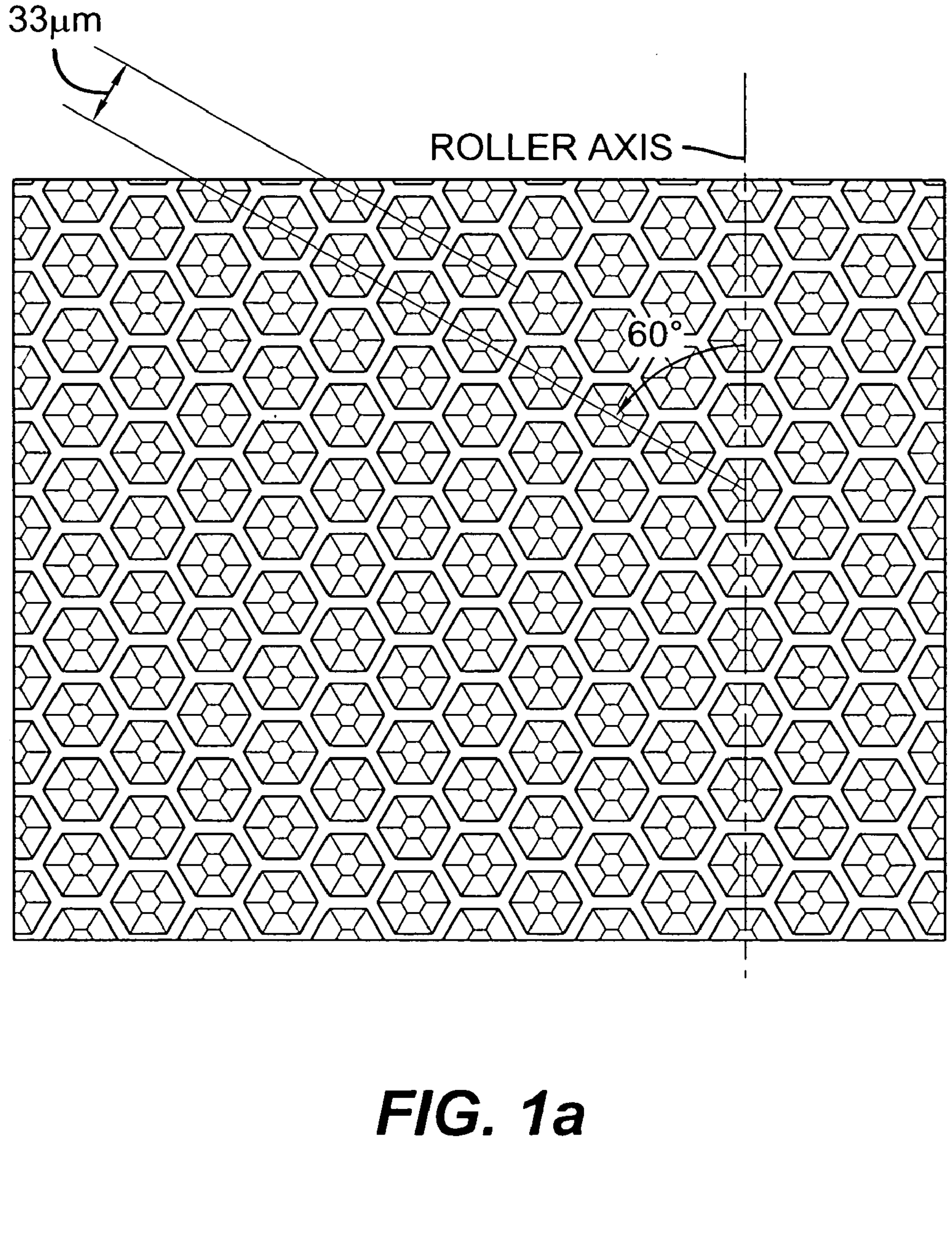
FIGS. 1*a* and 1*b* are views of a portion of a textured imaging member (TIM) and details of the cells thereof, for use in the printing apparatus according to this invention, on a significantly enlarged scale.
Figure 1B:
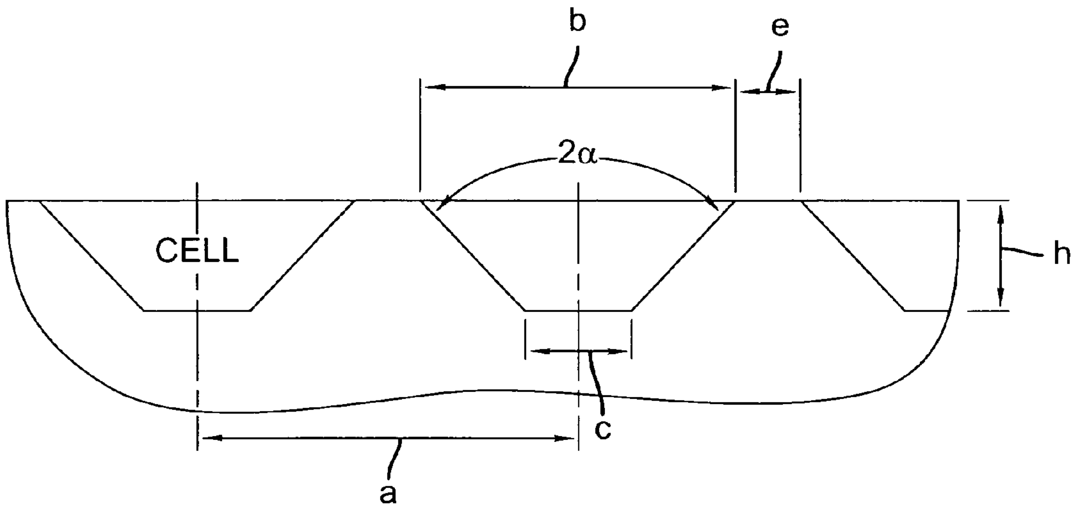

According to this invention, an ink jet mechanism is utilized to write an image, using ink having marking particles, on to the surface of a textured imaging member (TIM), such as a drum, a plate, or alternatively an endless belt. The texture of the TIM is specified so that the ink jet drops are contained in very small wells (cells) that are deep enough to fully contain any ink that is directed toward it. Referring to FIGS. 1*a* and 1*b*, a preferred exemplary structure for a TIM is shown (designated by numeral 12) where cells 14 are hexagonally shaped and closely packed. Of course, other shapes for the cells 14, such as diamond, rectangular, or oval for example, are suitable for use with this invention. The structural relation of the TIM cells 14 prevents ink deposited in the cells from coalescing, which blurs the image, by preventing the ink in the cells from migrating beyond the cell walls. The cells 14 can also correct satellites and jet errors by collecting ink drops within the cell walls.

The ink is not a conventional ink jet ink. Rather, it has electrically charged particles in a dielectric solvent, as described in co-pending U.S. patent application Ser. No. 11/445,713. The particles generally include a colorant such as a dye or pigment. Although electrically charged pigment particles can be used, it is preferable to use colorant particles having a colorant and a polymer binder such as polyester, polystyrene, etc. For certain applications, such as protecting the image or imparting a uniform gloss, for example, it is not necessary that the so-called marking particles include a colorant. Further, the particles should not swell, dissolve, or soften in the dielectric solvent. Suitable solvents for use in this invention include various hydrocarbons such as Isopar L and Isopar G, sold by Exxon, various high carbon alcohols, and various mineral oils, soy oil, for example. Low carbon alcohols such as methanol, ethanol, and isopropanol, for example, are too electrically conducting and would not be suitable for this invention. Other dielectric solvents such as dichoromethane, diiodomethane, hexane, heptane, or acetone, for example, would tend to dissolve the polymer and, therefore, would not be suitable for this invention. In addition, the flammability of certain organic solvents would make their use less desirable. Because of its electrical conductivity, water also would not be a suitable solvent.

The TIM 12 is an electrically conducting member. The TIM 12 includes cells 14 of uniform size and spacing. The spacing of the cells 14 is determined by the line frequency and image characteristics desired in the final print. The cells 14 must be of sufficient size to hold the entire volume of ink needed to achieve maximum density. The structure of the TIM 12 could be similar to an anilox roller or a gravure roller or plate in which the cells of the gravure roller or plate cover the entire printing area of the plate and are uniform in size. The electrically conducting layer of the TIM 12 can be over-coated with a thin non-conducting layer of material such a ceramic or a low surface energy material such as Teflon provided that the layer is sufficiently thin that a sufficient electric field can be established that will allow the marking particles to be ultimately transferred from the TIM 12 to a receiver, using the process that will be described forthwith.

Figure 5A:
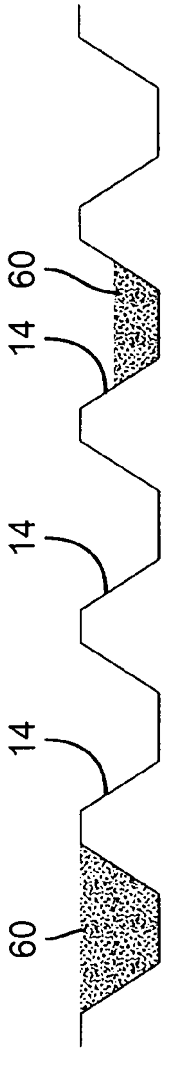
FIGS. 5*a*-5*d* are respective views, in cross-section, showing the sequential operation of the printing apparatus according to this invention as seen in FIG. 2.
Figure 5B:
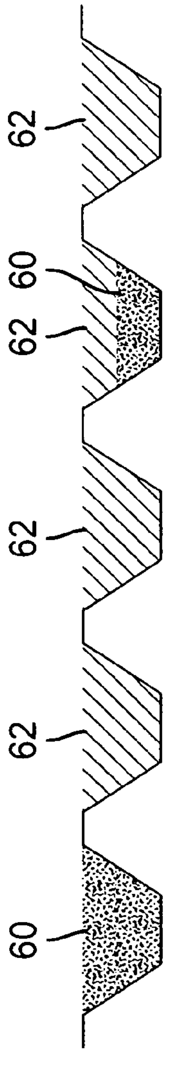

In one embodiment of the invention, the ink 60 described above is jetted into the cells 14 of a TIM 12 with the quantity of the ink jetted into each cell 14 determined by the desired image density on the final print in a manner corresponding to a positive image (see FIG. 5*a*). The cells 14 are then filled with a dielectric fluid 62, preferably the same fluid as that of the ink solvent. The fluid can be jetted into specific cells that are already partially filled with ink, or it can be uniformly applied to the surface of the TIM 12 and then skived from the surface, leaving each cell totally filled with a combination of ink and fluid, as shown in FIG. 5*b*. It should be noted that the ink droplets could be jetted in the vicinity of the cells 14 as long as the TIM 12 has a low surface energy coating such as Teflon so that the droplets will spontaneously flow into the cells 14. The meaning of the term "jetting" as used herein, includes both the instance wherein the droplets are directly jetted into the cells 14 and the instance wherein the droplets are jetted adjacent to the cells 14 and spontaneously flow into the cells 14.

Figure 3:
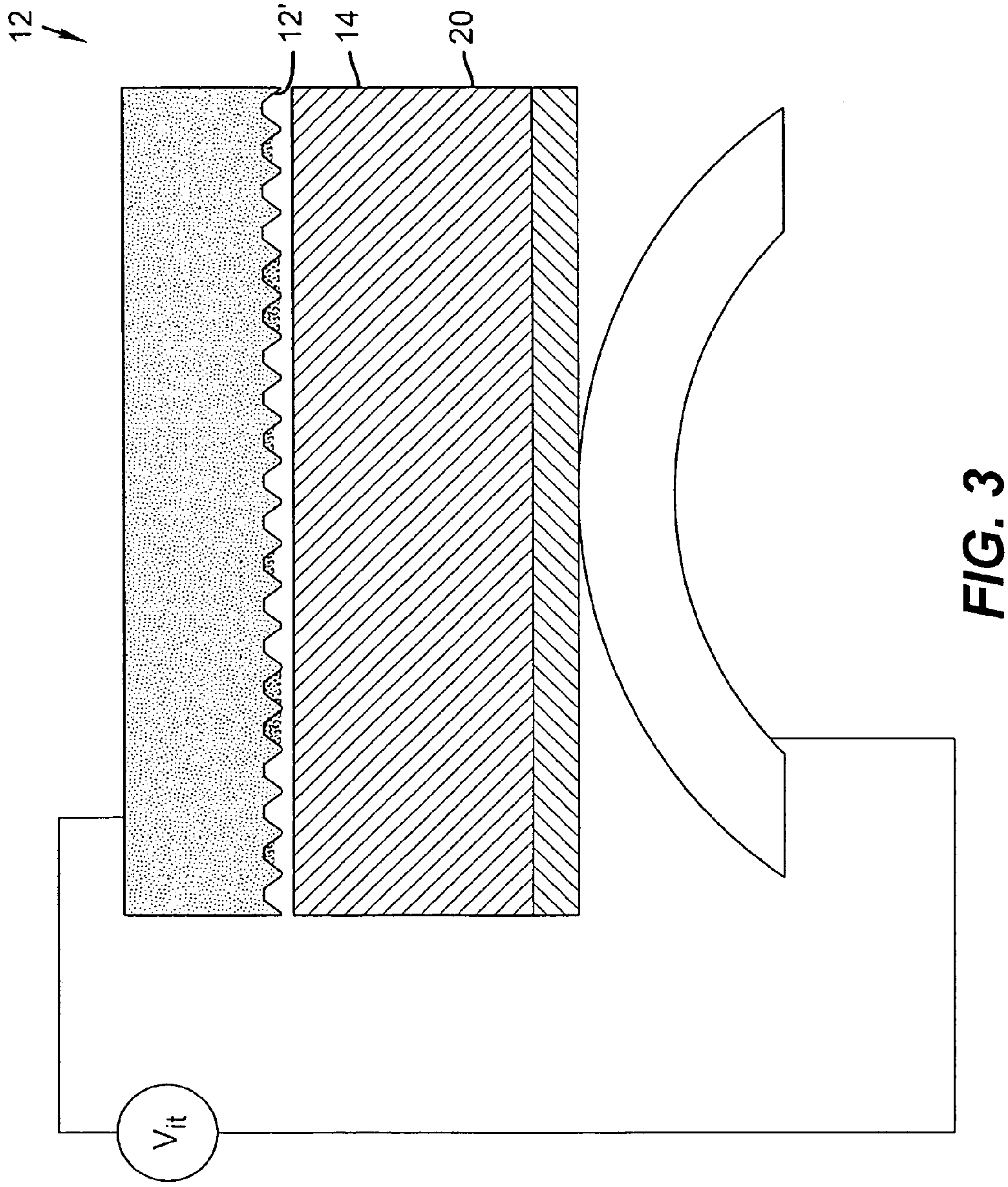
FIG. 3 is a side view, in cross-section of a portion of the anilox roller and intermediate member of the printing apparatus according to this invention.
Figure 5C:
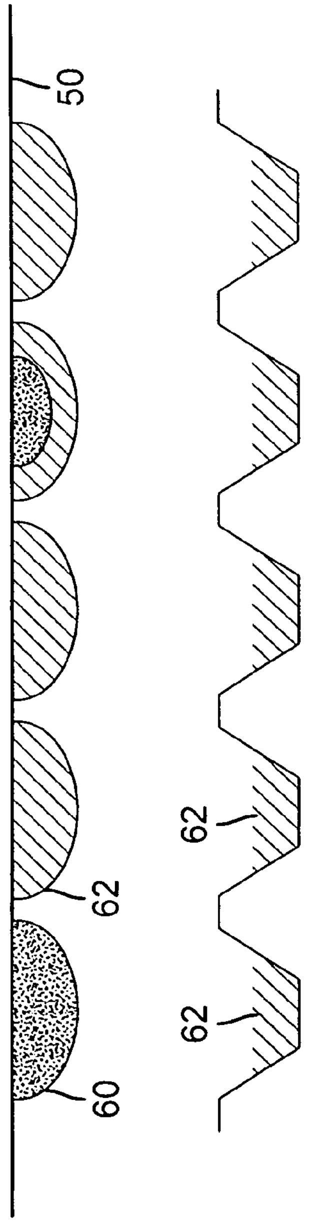
Figure 5D:
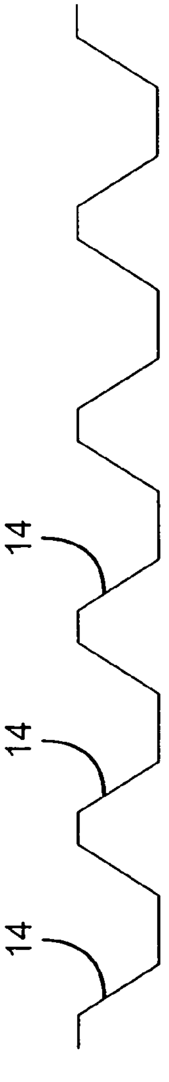

The marking particles in the ink 60 are transferred to a receiver 50 by applying an electrostatic field that urges the particles towards the receiver (see FIG. 5*c*). For example, the marking particles can be transferred directly to a final receiver, such as paper, by pressing the receiver against the TIM 12 and applying an electrostatic field using known methods such as a biased roller behind the receiver, charging the receiver with a corona or brush, or using other known processes similar to those used in electrophotographic engines. However, to avoid contamination, such as the introduction of paper fibers, for example, upon completion of transfer the cells 14 are cleaned by any suitable cleaning device (not shown) such that the cells 14 are completely empty (see FIG. 5*d*) the TIM 12 by a final receiver, it is preferable to transfer the image to an intermediate member, as illustrated in FIG. 3.

Figure 2:
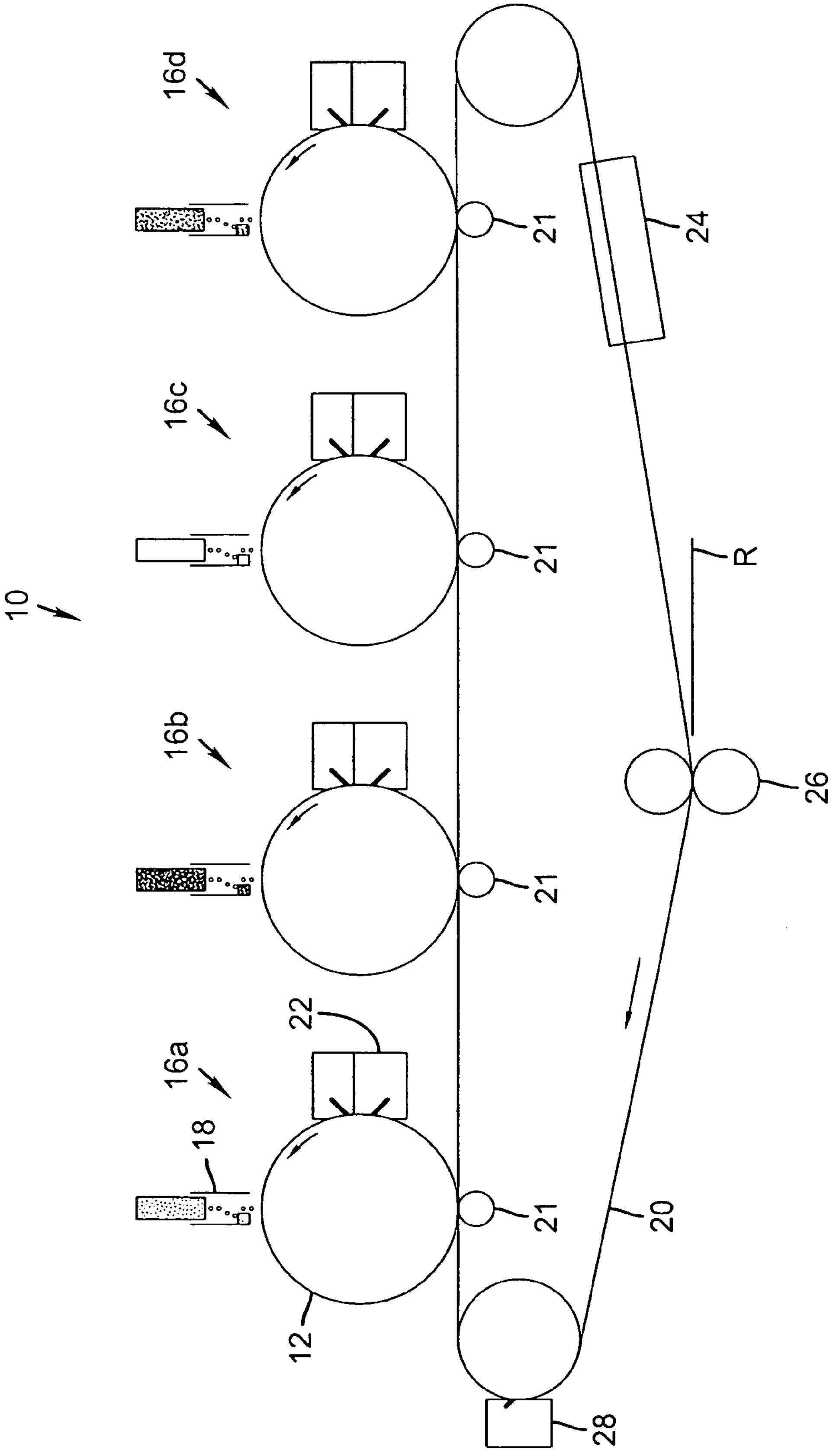
FIG. 2 is a schematic illustration of a preferred embodiment of the printing apparatus according to this invention.
Figure 4:
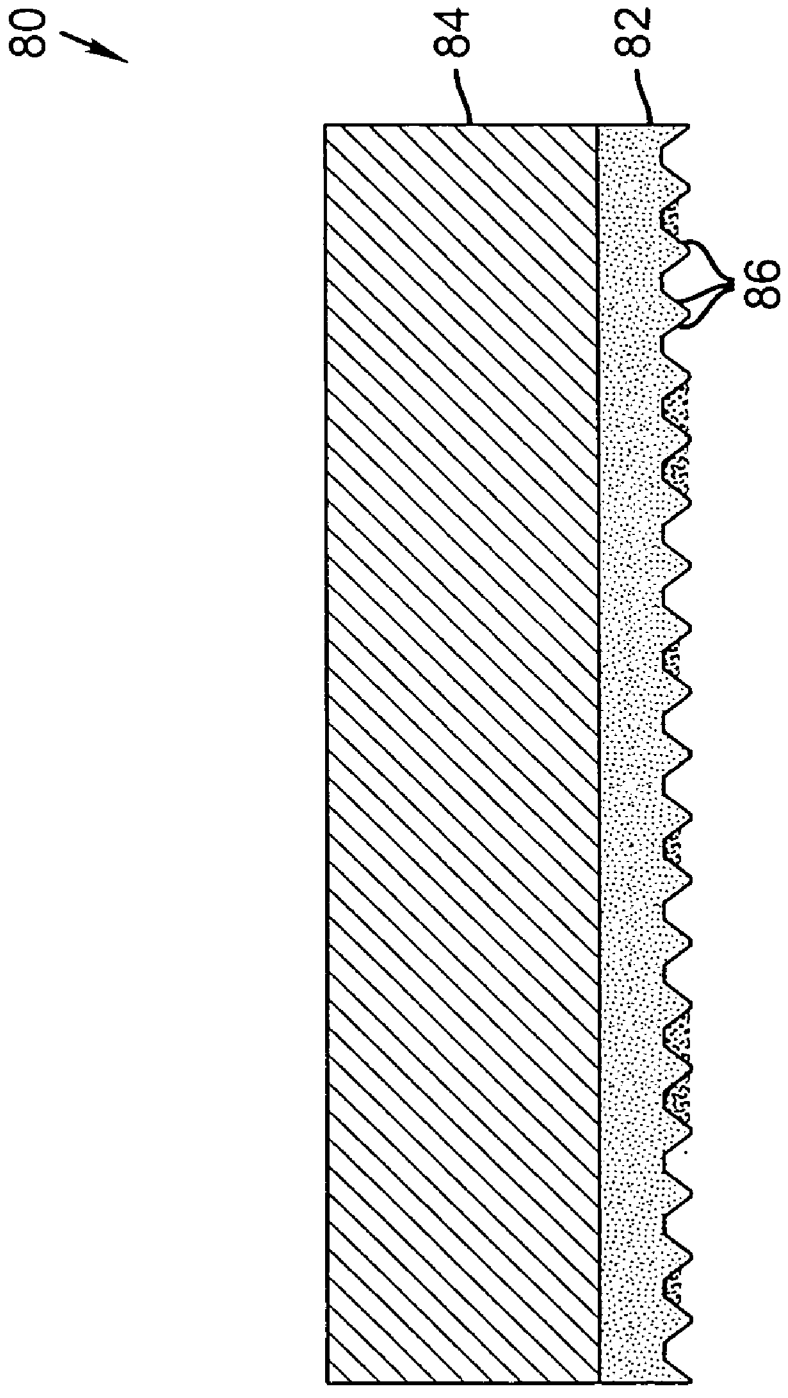
FIG. 4 is a side view, in cross-section of a portion of an alternate embodiment of the anilox roller of the printing apparatus according to this invention.

A preferred embodiment of a printing apparatus 10, according to this invention, is shown in FIG. 2. Referring to FIG. 2, the TIM 12 is shown as an anilox roller (with hexagonally shaped, closely packed cells 14). For the reasons set forth below, the anilox roller must have an electrode. As shown in FIG. 3, the anilox roller 12 may be a steel roller 12' (alternatively may be chrome coated), thus making electrical contact straightforward. That is, the anilox roller 12 is grounded and an intermediate member 20, further described below, in contact therewith, has an applied electrical bias connected thereto, such as voltage V. Alternatively, the anilox roller, designated by the numeral 80 in FIG. 4, may have a structure where a ceramic layer 82 is formed on top of steel (conducting) substrate 84. The ceramic layer 82 is etched (for example, with a high powered laser) to form the cells 86. In this case, the ceramic layer 82 is selected to be relatively thin, i.e., about twice the depth of the etched cell. The steel substrate 84 would then serve as the electrical contact.

Four basic, substantially identical imaging units designated as 16*a*-16*d* are shown in FIG. 2. More or less imaging units may be used if it is desired to create monochrome prints, two or three color spot color prints, or process color prints with four or more color separation images, with or without additional spot color separations. Each of the imaging units 16*a*-16*d* includes an ink jet device 18 that selectively jets ink in an image-wise fashion on to the TIM (anilox roller) 12, thereby creating a positive image in the cells 14 on the surface of the respective TIM 12. The image is thereafter fractionated and transferred to an intermediate member 20, which is preferably compliant, by an electrical field. Although any suitable intermediate member known in the electrophotographic art is suitable for use in this invention, a preferred intermediate member 20 has a volume resistivity between $1\times10^8$ and $1\times10^{11}$ ohm-cm and is preferably compliant. The intermediate member 20 could be a roller or a web. If it is a roller, then the support layer is preferably a conducting cylinder (aluminum, steel core) and the thickness of the compliant layer is preferably greater than 1 mm and less than 15 mm. If the intermediate member is a web, then the support material is preferably a plastic material such as polyimide, polyester, or polycarbonate, and the thickness of the compliant layer is preferably between 100 and 1,000 microns. The substrate preferably has a volume resistivity between $1\times10^8$ and $1\times10^{11}$ ohm-cm. As shown in FIGS. 2 and 3, the electrical bias (voltage V) is applied by conducting rollers 21 urging the intermediate web 20 into contact with the TIM rollers 12. Alternatively, to having bulk resistive properties, the plastic substrate of the intermediate member 20 could be insulated with a thin conductive ($<1\times10^6$ ohm-cm) coated between it and the compliant resistive blanket material. The thin conducting layer acts as the electrical contact. In this case, the TIM rollers 21 apply only pressure and the electrical bias connection to the thin conducting layer is not shown.

The transfer process effectively fractionates the developer, transferring the marking particles to the receiver while leaving the bulk of the liquid behind on the TIM 12. A conditioning unit 22 cleans the cells 14 of the TIM 12 after transfer in order to ready it for receiving the next image. Each imaging unit 16*a*-16*d* creates one color separation image, which is combined in register on the intermediate member 20 to form a desired multi-color image. An optional liquid removal unit 24 is shown that acts to remove excess liquid from the imaged intermediate member 20. The liquid depleted image carried by the intermediate member 20 is then transferred to a receiver member R (paper or other media) in a transfer zone 26, and the intermediate member 20 is cleaned by a cleaning unit 28 prior to re-entrance into operative relation with the imaging units 16*a*-16*d*. The solvent recovered by the conditioning unit can be filtered or otherwise purified and recycled back into the reservoir for the developer.

The invention has been described in detail with particular reference to certain preferred embodiments thereof, but it will be understood that variations and modifications can be effected within the spirit and scope of the invention.

PARTS LIST

12, 12' Textured imaging member (TIM)
14 Cells
16*a*-16*d* Imaging units
18 Ink jet device
20 Intermediate member

21 Conducting roller
22 Conditioning unit
24 Liquid removal unit
28 Cleaning unit
60 Ink
62 Dielectric fluid
80 Roller
82 Ceramic layer
84 Steel substrate
R Receiver member
V Voltage

What is claimed is:

1. A printing apparatus comprising:

an imaging member having an external surface and a series of substantially equal sized cells located over such surface;

an ink jet device for selectively ejecting droplets of ink, having marking particles and liquid, into said cells of said imaging member in a desired image-wise ink pattern;

a mechanism for filling the cells of said imaging member with a dielectric fluid after said ink jet device ejects droplets of ink into said cells; and transfer mechanism including a device for fractionating the marking particles in the ink from the liquid and transferring the image-wise marking particle pattern to a receiver member.

2. The printing apparatus according to claim 1 wherein said marking particles of ink ejected from said ink jet device are electrically charged.

3. The printing apparatus according to claim 2 wherein said transfer mechanism includes an electrical bias device for facilitating fractionating of said ink.

4. The printing apparatus according to claim 1 wherein said imaging member is a roller with said cells located substantially over the entire circumferential surface of said roller in a closely packed configuration.

5. The printing apparatus according to claim 4 wherein said configuration is selected from the group of configurations including hexagonal, diamond, rectangular, and oval shapes.

6. The printing apparatus according to claim 1 further including:

an intermediate member operatively associated with said imaging member;

a transport device for transporting a receiver member into operative association with said intermediate member; and wherein said transfer mechanism includes; and a first transfer mechanism between said intermediate member and said imaging member to fractionate said ink marking particles from said liquid and transfer an image-wise pigmented ink pattern from said imaging member to said intermediate member, leaving behind a substantial portion of liquid, and a second transfer mechanism between said intermediate member and a receiver member to transfer an image-wise ink pattern from said intermediate member to such receiver member, while such receiver member is in operative association with said intermediate member.

7. The printing apparatus according to claim 1 wherein said imaging member is a roller with said cells located substantially over the entire circumferential surface of said roller in a closely packed, hexagonal configuration.

8. The printing apparatus according to claim 1 further including a cleaning unit in association with said imaging member, wherein any liquid remaining in said cells of said printing member after transfer is removed prior to reuse.

9. A method of printing comprising the steps of:

jetting ink droplets, including marking particles and liquid, into cells of a textured imaging member;

filling the cells with a dielectric liquid;

fractionating the ink in the cells of the textured imaging member to separate marking particles from liquid;

transferring the marking particles from the fractionated ink on the textured imaging member to a receiver; and removing left over excess liquid from the textured imagine member.

10. A method according to claim 9 wherein the ink is jetted into the cells in an image-wise fashion.

11. A method according to claim 10 wherein an electrical bias is applied to facilitate fractionating the ink in the cells.

12. A method according to claim 9 wherein marking particles are first transferred from a textured imaging member to an intermediate member and thereafter transferred from the intermediate member to a receiver member.

* * * * *